(12) United States Patent
Paul (10) Patent No.: US 10,617,949 B1
(45) Date of Patent: Apr. 14, 2020

(54) DIGITAL FEEDBACK PROMPT

(71) Applicant: Facebook, Inc., Menlo Park, CA (US)

(72) Inventor: Debashish Paul, Sunnvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/154,698

(22) Filed: Oct. 8, 2018

(51) Int. Cl.
| | |
|---|---|
| G06F 3/048 | (2013.01) |
| A63F 13/47 | (2014.01) |
| A63F 13/63 | (2014.01) |
| G06F 3/0482 | (2013.01) |

(52) U.S. Cl.
CPC .............. *A63F 13/47* (2014.09); *A63F 13/63* (2014.09); *G06F 3/0482* (2013.01)

(58) Field of Classification Search
CPC ......... H04L 51/10; H04L 51/32; H04L 67/22; H04N 21/00; H04N 21/472; H04N 21/8456
USPC ........................................................ 709/206
See application file for complete search history.

(56) References Cited

U.S. PATENT DOCUMENTS

| | | | |
|---|---|---|---|
| 7,810,037 B1 | 10/2010 | Edwards et al. | |
| 8,973,100 B2 | 3/2015 | Rubinstein et al. | |
| 9,917,804 B2* | 3/2018 | Valdivia | .................. H04L 51/16 |
| 10,091,318 B2 | 10/2018 | Modi et al. | |
| 10,405,020 B2 | 9/2019 | Bruich et al. | |
| 2007/0130164 A1* | 6/2007 | Kembel | ................ G06F 16/958 |
| 2010/0325218 A1 | 12/2010 | Castro et al. | |
| 2013/0110885 A1* | 5/2013 | Brundrett, III | ....... G06F 16/211 707/812 |
| 2013/0219333 A1* | 8/2013 | Palwe | ............... H04M 1/72522 715/810 |
| 2014/0186004 A1 | 7/2014 | Hamer | |
| 2014/0279068 A1 | 9/2014 | Systrom et al. | |
| 2015/0058750 A1* | 2/2015 | Chakra | .................. G06Q 50/01 715/753 |
| 2016/0086019 A1 | 3/2016 | Ganong et al. | |
| 2016/0247535 A1 | 8/2016 | Latulipe et al. | |
| 2016/0292494 A1 | 10/2016 | Ganong et al. | |
| 2016/0364368 A1 | 12/2016 | Chen et al. | |
| 2017/0085599 A1* | 3/2017 | Roche | ..................... H04L 51/36 |
| 2017/0149714 A1* | 5/2017 | Valdivia | ................. H04L 51/16 |
| 2018/0041461 A1 | 2/2018 | Kurani | |

(Continued)

OTHER PUBLICATIONS

Notice of Allowance received for U.S. Appl. No. 16/154,695 dated Jan. 15, 2020, 28 pages.

(Continued)

*Primary Examiner* — David Phantana-angkool
(74) *Attorney, Agent, or Firm* — FisherBroyles, LLP (57) ABSTRACT

The disclosed computer-implemented method for sharing content and allowing users to react using storyline-based feedback may include (1) posting a digital story for consumption by one or more specified users, (2) providing, within the posted digital story, an electronic feedback prompt that enables a user to initiate different types of feedback, each of which electronically portrays a reaction to the digital story, (3) receiving, from the electronic feedback prompt, a user selection of a selectable element corresponding to a certain type of digital feedback, and (4) in response to receiving the user selection, initiating a digital creation process to create the certain type of digital feedback. Various other methods, systems, and computer-readable media are also disclosed.

20 Claims, 10 Drawing Sheets

(56) References Cited

U.S. PATENT DOCUMENTS

| | | | |
|---|---|---|---|
| 2018/0046855 A1 | 2/2018 | Ganong et al. | |
| 2018/0192142 A1* | 7/2018 | Paul | H04N 21/64738 |
| 2018/0286097 A1 | 10/2018 | Wang | |
| 2019/0130498 A1* | 5/2019 | Constantinides | G06Q 50/01 |
| 2019/0147017 A1* | 5/2019 | Tran | G06F 17/212 |
| | | | 715/720 |
| 2019/0166074 A1* | 5/2019 | Voss | H04L 51/10 |
| 2019/0197315 A1* | 6/2019 | Zhang | G06K 9/00456 |
| 2019/0227989 A1* | 7/2019 | Keel | G06F 16/168 |
| 2019/0302993 A1* | 10/2019 | Francis | G11B 27/031 |

OTHER PUBLICATIONS

Preinterview First Office Action received for U.S. Appl. No. 16/154,697 dated Nov. 21, 2019, 21 pages.

* cited by examiner

DIGITAL FEEDBACK PROMPT

BACKGROUND

Current social media applications allow users all over the world to share their thoughts and ideas on various topics. They also allow users to share media including videos, gifs, images, and text with each other. Most current social media applications allow users to create posts that are visible to friends and family, or to the public in general. Those users that can view the post may have the opportunity to provide various types of feedback (e.g., by posting an emoji-based reaction to the post, by leaving a text-based comment to the post, and/or by adding a feedback story to a storyline associated with the post). In some cases, however, a flow for creating feedback may be disorganized and/or confusing due to the multiple different types of feedback available. Thus, the instant disclosure identifies a need for improved systems and methods for leaving feedback of different types related to social media compositions.

SUMMARY

As will be described in greater detail below, the instant disclosure describes a system with a digital feedback prompt that facilitates leaving feedback for social media posts. In one example, a computer-implemented method may include (1) posting a digital story for consumption by one or more specified users, (2) providing, within the posted digital story, an electronic feedback prompt that enables a user to initiate different types of feedback, each of which electronically portrays a reaction to the digital story, (3) receiving, from the electronic feedback prompt, a user selection of a selectable element corresponding to a certain type of digital feedback, and (4) in response to receiving the user selection, initiating a digital creation process to create the certain type of digital feedback. In some examples, the method may also include, prior to posting the digital story (during a story creation process), (1) receiving a first input indicating that one or more portions of content are to be part of the digital story, and (2) receiving a second input indicating that the digital story is available to receive storyline-based feedback (e.g., ephemeral visual content related to the digital story that is stored in a same container as the digital story).

The different types of feedback may include a variety of different feedback types, such as storyline-based feedback (e.g., including a feedback story with ephemeral visual content depicting a reaction to the digital story) and/or one-click feedback (e.g., including an emoji depicting a reaction to the digital story). In one example, the electronic feedback prompt may include (1) a storyline-based feedback portion with a software widget that initiates the creation of a feedback story, (2) a one-click feedback portion with selectable emojis, and/or (3) a feedback summary portion with information describing existing feedback stories that have already been added to the digital story. In examples in which the electronic feedback prompt includes a feedback summary portion, the feedback summary portion may alternate between a first configuration, indicating that a viewer has already consumed the existing feedback stories, and a second configuration, indicating that the viewer has not consumed at least a subset of the existing feedback stories.

In one such example, receiving the user selection of the selectable element may include receiving input to the software widget and initiating the digital creation process may include presenting a feedback story creation screen (e.g., that is configured with vertically aligned layers including a text layer and a media layer). Then, the method may include creating a feedback story based on content submitted to the feedback story creation screen and updating the digital story with the feedback story in storyline form. In one example, the method may further include (1) providing a subsequent graphics-selection screen in response to receiving content via the feedback story creation screen and (2) automatically generating search terms to select visual content to display on the graphics-selection screen based on the content received via the feedback story creation screen.

In one embodiment, receiving the user selection of the selectable element may include receiving a selection of an emoji from among the selectable emojis. In this embodiment, initiating the digital creation process may include digitally affixing the selected emoji to the digital story.

In addition, a corresponding system may include a physical processor and physical memory. The system may also include several modules, stored in memory, including a presentation module (e.g., for posting a digital story for consumption by one or more specified users and/or providing, within the posted digital story, an electronic feedback prompt that enables a user to initiate different types of feedback, each of which electronically portrays a reaction to the digital story). The system may further include an input receiving module (e.g., for receiving, from the electronic feedback prompt, a user selection of a selectable element corresponding to a certain type of digital feedback and/or initiating a digital creation process to create the certain type of digital feedback).

In some examples, the above-described method may be encoded as computer-readable instructions on a computer-readable medium. For example, a computer-readable medium may include one or more computer-executable instructions that, when executed by at least one processor of a computing device, may cause the computing device to generate a user interface that facilitates (1) posting a digital story for consumption by one or more specified users, (2) providing, within the posted digital story, an electronic feedback prompt that enables a user to initiate different types of feedback, each of which electronically portrays a reaction to the digital story, (3) receiving, from the electronic feedback prompt, a user selection of a selectable element corresponding to a certain type of digital feedback, and, in response to receiving the user selection, (4) initiating a digital creation process to create the certain type of digital feedback.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to methods and systems that enable users to digitally react to posted stories. As will be explained in greater detail below, embodiments of the instant disclosure may provide an easier means of creating different types of feedback using a feedback composer. For example, an initial screen presented by a feedback composer may allow a user to select between leaving lightweight feedback (e.g., by clicking an icon, such as a thumbs-up icon) and leaving more substantial feedback (e.g., by creating a feedback composition to add to a storyline). This initial screen may take the form of a prompt displayed within a published story. By simplifying a creation flow for story feedback, the embodiments herein provide multiple fundamental presentation and user interface improvements to current social media applications and websites. These improvements may also improve the functioning of a computer itself by reducing the number of actions that must be received by the computer from a user attempting to create digital feedback and/or reducing a number of screens required to receive different types of feedback.

Figure 1:
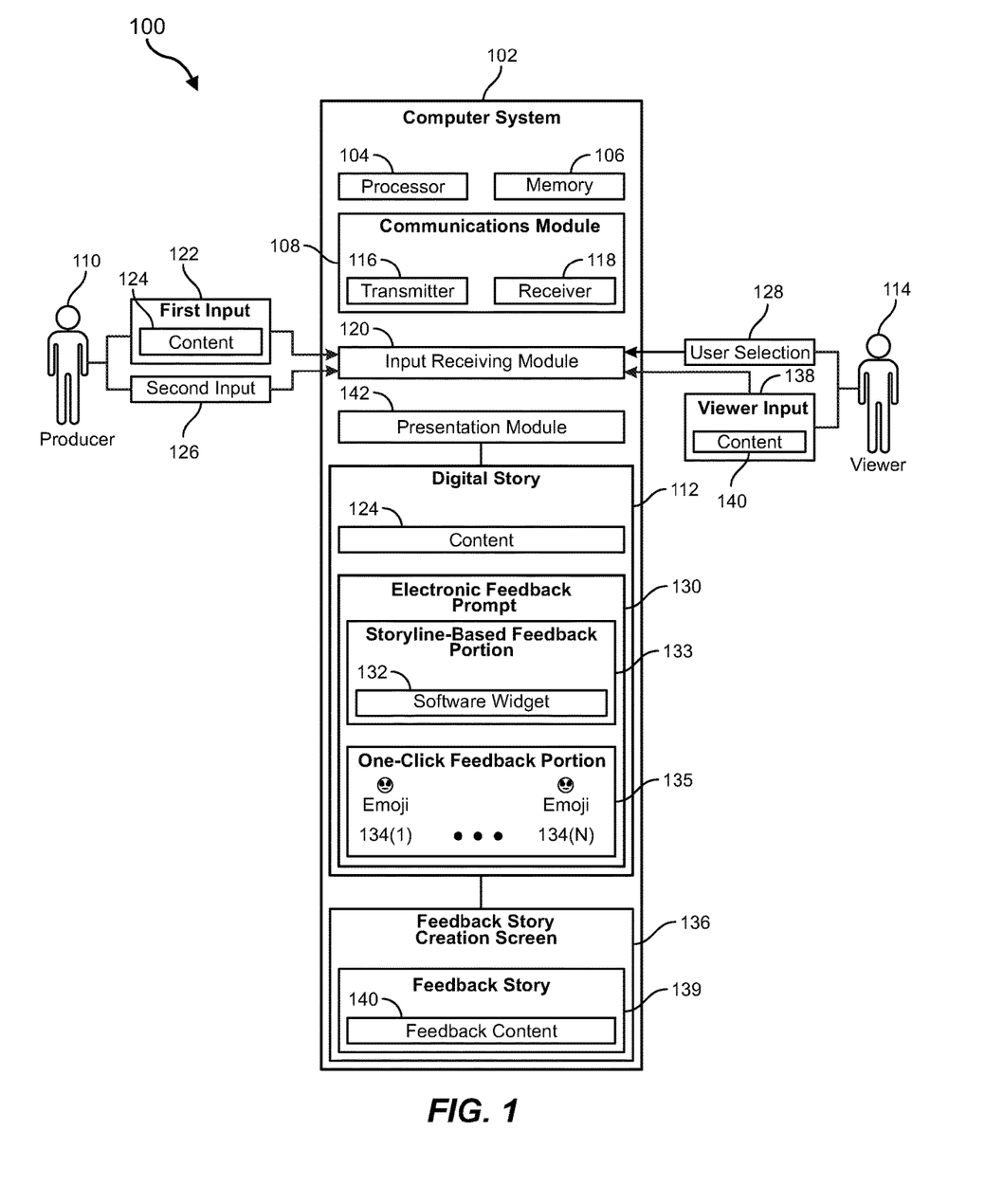
FIG. 1 illustrates a system architecture that allows users to react to posted content using different types of feedback.

The following will provide, with reference to FIGS. 1-11, detailed descriptions of improved systems and methods for collecting inputs to create digital feedback to posted story compositions. FIG. 1, for example, illustrates an example system (i.e., a computing architecture 100) in which many of the embodiments described herein may operate. The computing architecture 100 may include a computer system 102. The computer system 102 may include at least one processor 104 and at least some system memory 106. The computer system 102 may be any type of local or distributed computer system, including a cloud computer system.

The computer system 102 may include program modules for performing a variety of different functions. The program modules may be hardware-based, software-based, or may include a combination of hardware and software. Each program module may use or represent computing hardware and/or software to perform specified functions, including those described herein below.

For example, a communications module 108 may be configured to communicate with other computer systems (e.g., with a user device being used by a producer 110 of a digital story 112 or a user device being used by a viewer 114 of the digital story 112). The communications module 108 may include any wired or wireless communication means that can receive and/or transmit data to or from other computer systems. These communication means may include radios including, for example, a hardware-based transmitter 116, a hardware-based receiver 118, or a combined hardware-based transceiver capable of both receiving and transmitting data. The radios may be WIFI radios, cellular radios, Bluetooth radios, global positioning system (GPS) radios, or other types of radios. The communications module 108 may be configured to interact with databases, mobile computing devices (such as mobile phones or tablets), embedded systems, or other types of computing systems.

The computer system 102 of FIG. 1 may further include other modules including an input receiving module 120. The input receiving module 120 (which may be different than or the same as receiver 118) may receive inputs from the producer 110 (i.e., submitted via the producer's computing device) and/or the viewer 115 (i.e., submitted via the viewer's computing device).

The input receiving module 120 may receive a variety of different inputs. For example, input receiving module 120 may receive (from producer 110) a first input 122 submitting content 124 for the digital story 112 (e.g., media content) and/or a second input 126 indicating that the digital story 112 is available to receive storyline-based feedback. As another example, input receiving module 120 may receive (from viewer 114) a user selection 128 of one or more selectable elements within an electronic feedback prompt 130. For example, the user selection 128 may select a software widget 132, from a storyline-based feedback portion 133 of the electronic feedback prompt 130, that triggers a feedback-story creation process. As another example, the user selection 128 may select one or more of emojis 134 (1)-(N), from a one-click feedback portion 135, that may be affixed to the digital story 112). A user selection of software widget 132 may navigate to a feedback story creation screen 136 to which the viewer 114 may submit viewer input 138 (e.g., transmitting content 140) to create a feedback story 139.

The computer system 102 may further include a presentation module 142 that may post the digital story 112 (created based on input from the producer 110), present the feedback story creation screen 136, and/or present the feedback story 139 (created based on input from the viewer 114). These concepts will be explained in greater detail below with regard to the method 200 of FIG. 2.

Figure 2:
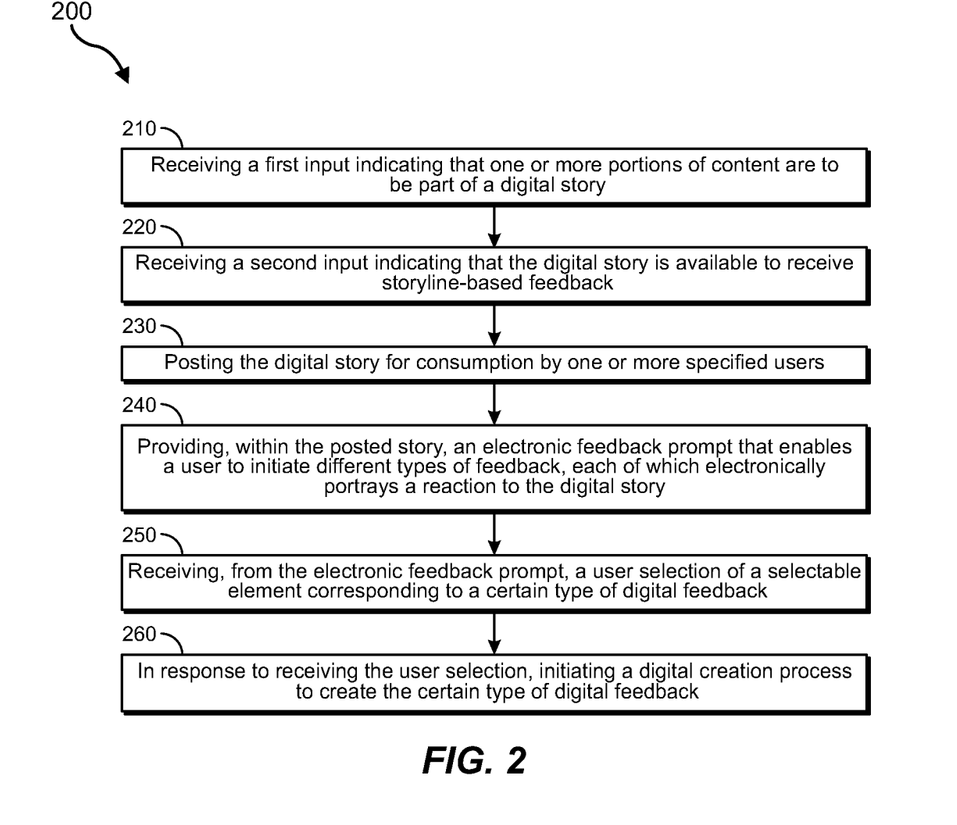
FIG. 2 illustrates a flow diagram of an exemplary method for reacting to posted content using different types of feedback.

FIG. 2 is a flow diagram of an exemplary computer-implemented method 200 for sharing digital stories in a manner that facilitates the creation of digital feedback reacting to the digital stories. The steps shown in FIG. 2 may be performed by any suitable computer-executable code and/or computing system, including the computer system 102 illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210 the method 200 may include receiving a first input indicating that one or more portions of content are to be part of a digital story. For example, as illustrated in FIG. 1, the input receiving module 120 may receive the first input 122 from the producer 110 indicating that one or more portions of content 124 are to be part of the digital story 112. In this example, the producer 110 may have submitted the first input 122 to a user device as part of a story creation process and input receiving module 120 may have received the first input 122 via the user device. As a specific example, the first input 122 may represent a submission of a digital media item (e.g., a digital photograph) to be included within the digital story 112.

Figure 3:
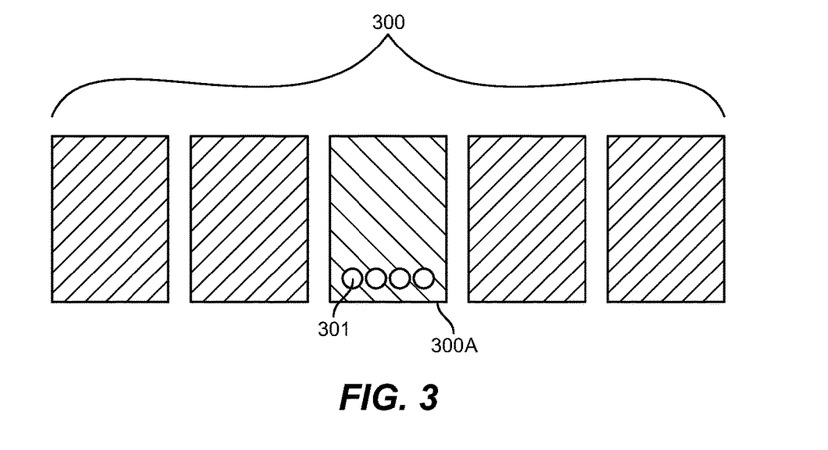
FIG. 3 provides an exemplary illustration of a digital story.

The term "story" as used herein generally refers to any type of content including, without limitation, text, pictures, videos, gifs, and/or links. A story may include a single post, or a series of two or more posts. A story may be related to an event, place, person, image, a location, a hashtag, or other item. A story be ephemeral in nature, and may be set to expire (that is, be removed from a social media application or online website to which the story is posted) after a certain amount of time. In some examples, a stories consumption channel may display, to a viewer, a series of stories created by other users, shown in a slideshow format, one by one. For example, as illustrated in FIG. 3, a consumption channel may show multiple stories 300. Each story is represented in FIG. 3 by a story card (e.g., 300A). In some examples, each of the stories may include indications of users with whom the story was shared. For example, the story represented by story card 300A may have been shared with four (or more) users, each represented by an icon or picture 301.

The method 200 of FIG. 2 may further include receiving a second input indicating that the story is available to receive storyline-based feedback (step 220). For example, the producer 110 in FIG. 1 may have submitted the second input 126 to his or her user device indicating that a story that he or she is in the process of creating (e.g., the digital story 112) will be available to receive storyline-based feedback once the story is published.

In at least some embodiments, "storyline-based feedback" may refer to a digital reaction to an original story that also takes the form of a story, having its own media content that relates to the media content of the original story. This storyline-based feedback (i.e., a feedback story) may be grouped with and stored with the original post (creating a "storyline"). As with the original story, a feedback story may be ephemeral in nature, and may be set to expire (that is, removed from the social media application or online website) after a certain amount of time. In some cases, after the original story has been posted, and after multiple feedback stories have come in, the original story and its subsequent feedback stories may expire together once the last ephemeral feedback story expires.

Figure 4:
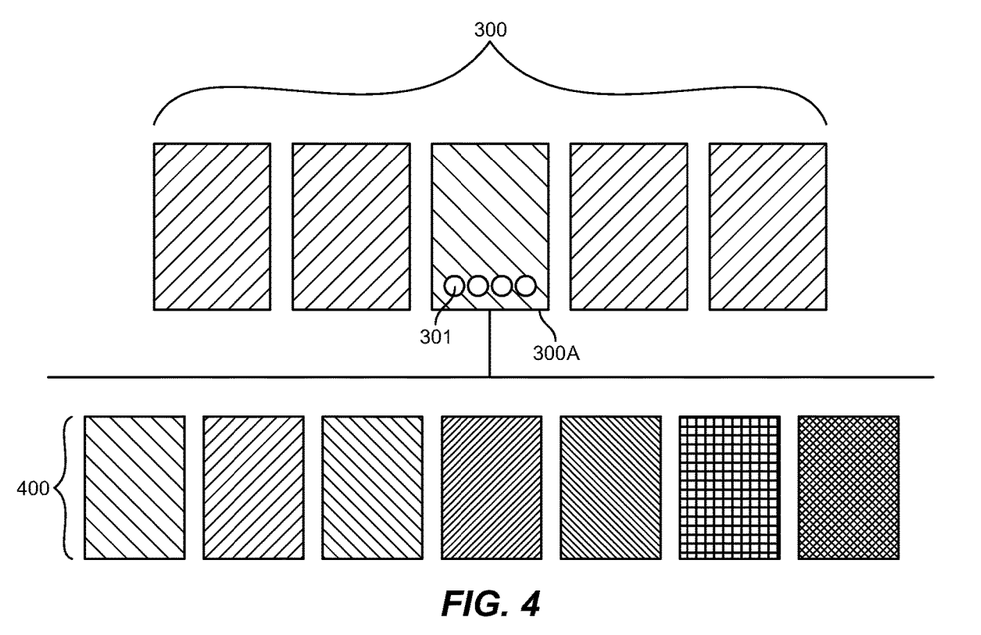
FIGS. 4-5 provide exemplary illustrations of a digital storyline.
Figure 5:
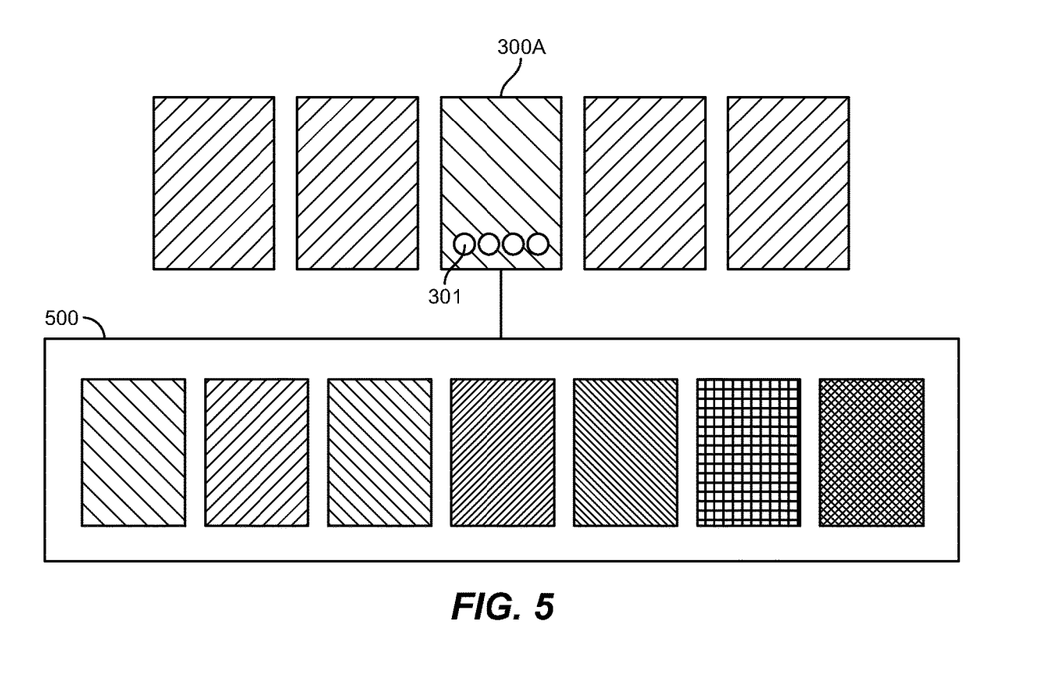

FIGS. 4-5 provide an exemplary depiction of a storyline based on the story represented by the story card 300A in FIG. 3. As discussed above, the story represented by the story card 300A may have been shared with four (or more) users. Those with whom the story was shared may respond with their own feedback stories (depicted as feedback stories 400 in FIG. 4). Each of these feedback stories may form a storyline. Then, if a viewer being presented with the stories 300 selects a story for which feedback stories have been posted (e.g., by selecting story card 300A), each of the feedback stories will be presented to the viewer.

As shown in FIG. 5, feedback stories may be stored together as a single unit or single data structure (e.g., in the same container). For example, the feedback stories 400 may be stored in a data structure 500. This data structure 500 may include the original story (300A) and some or all of the corresponding storyline-based replies (e.g., feedback stories 400). The data structure 500 may be archived in a local or remote data store.

Returning to FIG. 2, after receiving the first and second user input, the method 200 may include posting the digital story for consumption by one or more specified users (step 230). For example, the presentation module 142 may present the digital story 112 for consumption by the viewer 114 (e.g., in response to the input receiving module 120 receiving a third input from the producer 110 indicating that the digital story 112 is to be posted). The posted digital story 112 may be available to one or more specified persons (e.g., friends or family members), or to the public in general (e.g., based on a privacy setting selected by the producer 110).

Figure 6:
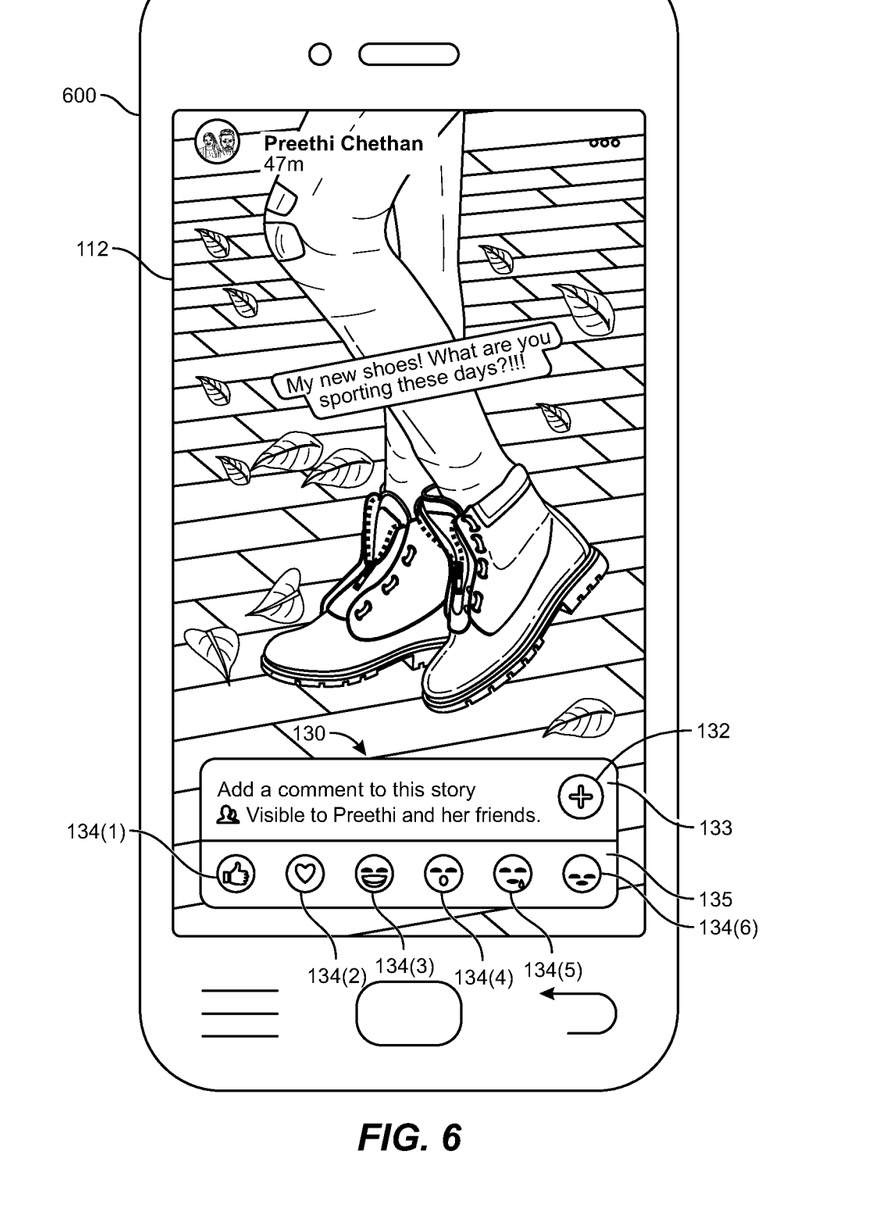
FIG. 6 illustrates an exemplary image of a user interface with an exemplary feedback prompt.

In some examples, the method 200 may further include providing, within the posted digital story, an electronic feedback prompt that enables a user to initiate different types of feedback, each of which electronically portrays a reaction to the digital story (step 240). For example, the presentation module 142 may provide, within the posted digital story 112, the electronic feedback prompt 130. FIG. 6 depicts an exemplary embodiment of the posted digital story 112, displayed within a user device 600 of the viewer 114, with an exemplary embodiment of the electronic feedback prompt 130 superimposed over a media item (a picture of a woman's shoes in FIG. 6).

As illustrated in FIG. 6, the electronic feedback prompt 130 may include at least two portions dedicated to creating different forms of feedback for the digital story 112. For example, the electronic feedback prompt 130 in FIG. 6 includes a storyline-based feedback portion (133) and a one-click feedback portion (135). Each of these portions may be directed to creating a different type of feedback for the digital story 112.

First, the one-click feedback portion 135 may be directed to creating lightweight feedback (e.g., feedback that may be created with a single mouse-click and/or screen tap). Thus, the one-click feedback portion 135 may include multiple selectable emojis (134(1)-134(6)). With one click, the viewer 114 may select one of the emojis that depicts a reaction of the viewer 114 to the digital story 112, which will then be affixed to the digital story 112. For example, if the viewer 114 loves the digital story 112, he or she may select emoji 134(2) (e.g., an emoji of a heart) as depicted in FIG. 6. In response, the emoji 134(2) may be affixed to the digital story 112 after being selected. In some examples, the image included on the selected emoji may be affixed to the digital story 112. In other examples, a written description of a reaction depicted by the image may be affixed to the digital story 112.

Next, the storyline-based feedback portion 133 may be directed to creating feedback stories. For example, as shown in FIG. 6, the storyline-based feedback portion 133 may include a software widget (132) that initiates the creation of a feedback story (feedback story 139 in FIG. 1).

In certain embodiments, the electronic feedback prompt 130 (which may include a trigger, such as software widget 132, for creating a feedback story) may only be displayed if, during the story creation process, a producer opted in to receiving storyline-based feedback. In these embodiments, the method 200 may include receiving an input (e.g., second input 126) from the producer 110 indicating that the digital story 112 is available to receive storyline-based feedback.

Returning to FIG. 2, after providing the electronic feedback prompt, the method 200 may include receiving, from the electronic feedback prompt, a user selection of a selectable element corresponding to a certain type of digital feedback (step 250). For example, the input receiving module 120 in FIG. 1 may receive the user selection 128. In some examples, the user selection 128 may select the software widget 132 from the storyline-based feedback portion 133 of the electronic feedback prompt 130. Additionally or alternatively, the user selection 128 may select a selectable emoji from the one-click feedback portion 135 of the electronic feedback prompt 130.

In response to receiving the user selection, the method 200 of FIG. 2 may include initiating a digital creation process to create the certain type of digital feedback corresponding to the element selected by the user selection (step 260). For example, the input receiving module 120 may initiate a digital creation process in response to receiving the user selection 128. The systems described herein may initiate a variety of different creation processes depending on the type of digital feedback initiated by the user selection 128. For example, in examples in which the user selection 128 selects an emoji from the one-click feedback portion 135 of the electronic feedback prompt 130 (e.g., 134(2) in FIG. 6), the systems may initiate a feedback creation process by sending an instruction for the selected emoji and/or a written description of the selected emoji to be digitally affixed to the digital story 112.

Figure 7:
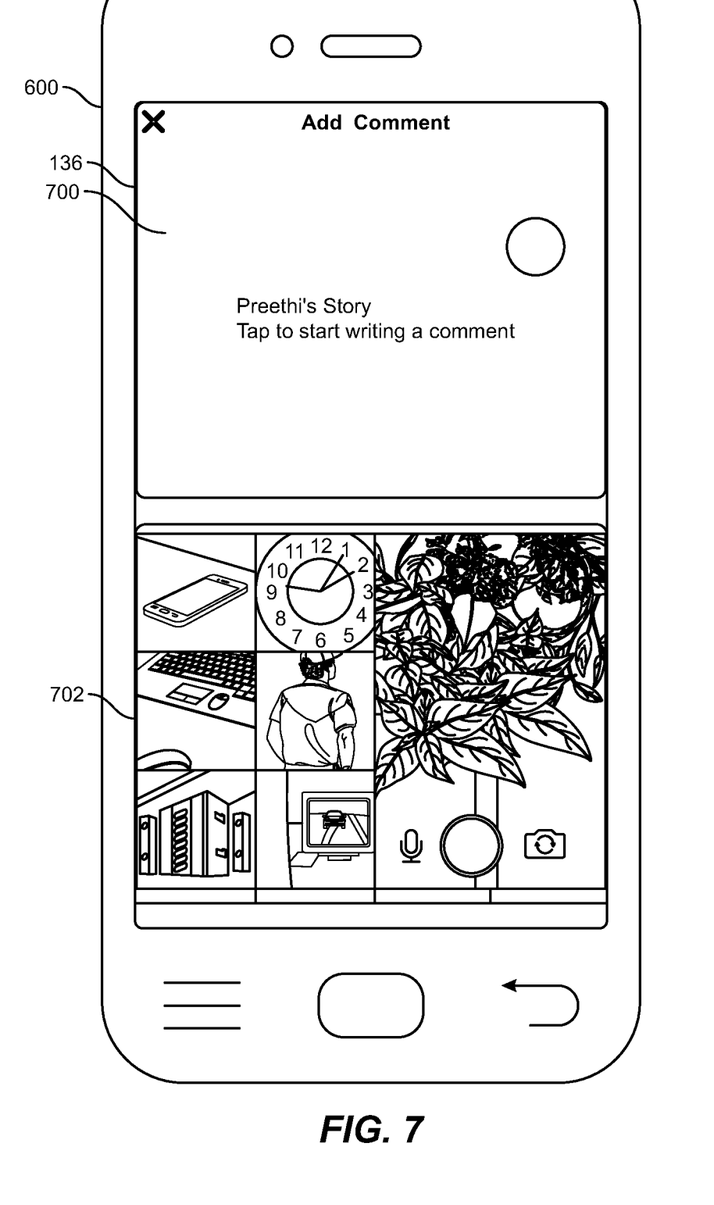
FIG. 7 illustrates an exemplary image of a user interface for composing a digital feedback story, which may be presented based on a user selection submitted to the exemplary feedback prompt illustrated in FIG. 6.

In additional or alternative examples in which the user selection 128 selects the software widget 132, the systems may initiate a feedback creation process by presenting the feedback story creation screen 136. This feedback story creation screen 136 may be configured to allow a consumer of an original story (such as the viewer 114) to create a feedback story that reacts to the original story (e.g., the digital story 112). FIG. 7 illustrates an exemplary embodiment of the feedback story creation screen 136.

The feedback story creation screen 136 may include a variety of configurations. For example, as shown in FIG. 7, the feedback story creation screen 136 may include multiple vertically aligned layers such as a text layer 700, with a text box from which text from the viewer 114 may be received, and a media layer 702, from which media such as a photograph and/or video may be received.

In one embodiment, the disclosed systems and methods may further include providing a subsequent graphics-selection screen with graphics that may be selected to include in the feedback story 139. In some examples, the subsequent graphics-selection screen may be provided in response to receiving content via the feedback story creation screen 136.

Figure 8:
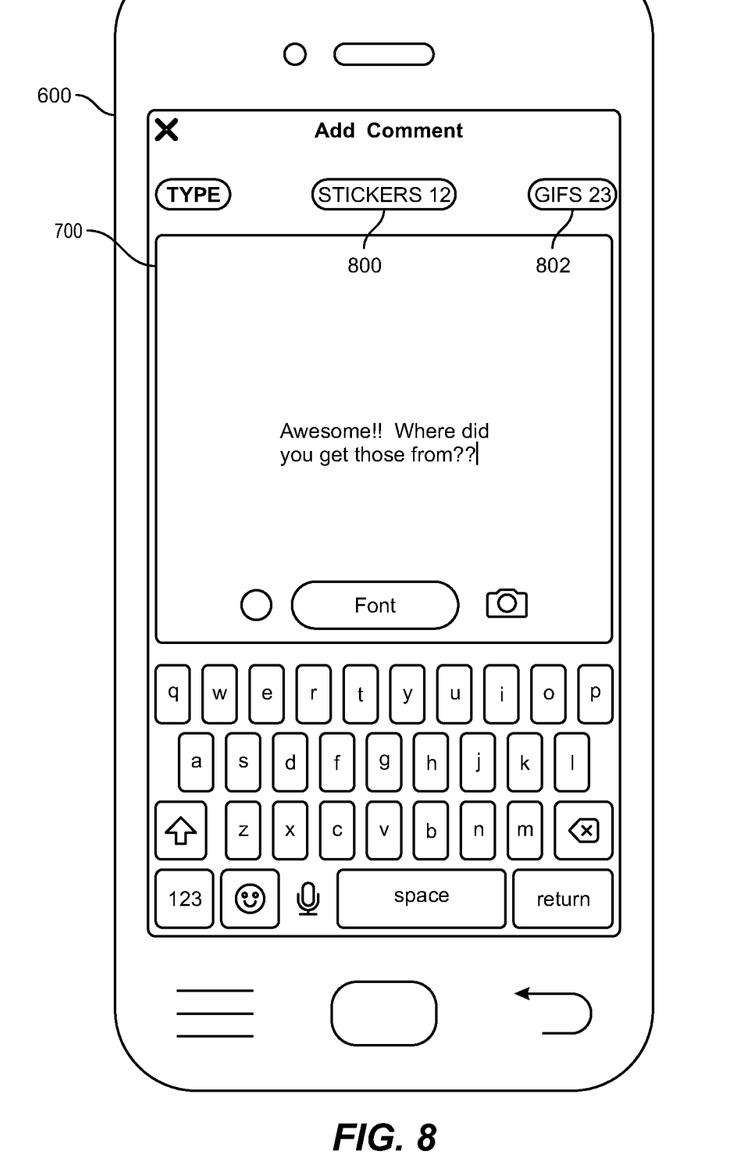
FIG. 8 illustrates an exemplary image of another user interface for composing a digital feedback story, from which text may be submitted.

For example, as shown in FIG. 8, the viewer 114 may have selected the text box within text layer 700 and typed the words "Awesome!! Where did you get those from??" in an expanded text screen presented in response to the selection of the text box. In response to selecting the text box and/or submitting the text, a stickers button 800 (configured to navigate to a stickers screen) and a gifs button 802 (configured to navigate to a gifs screen) may be presented within the feedback story creation screen 136.

Figure 9:
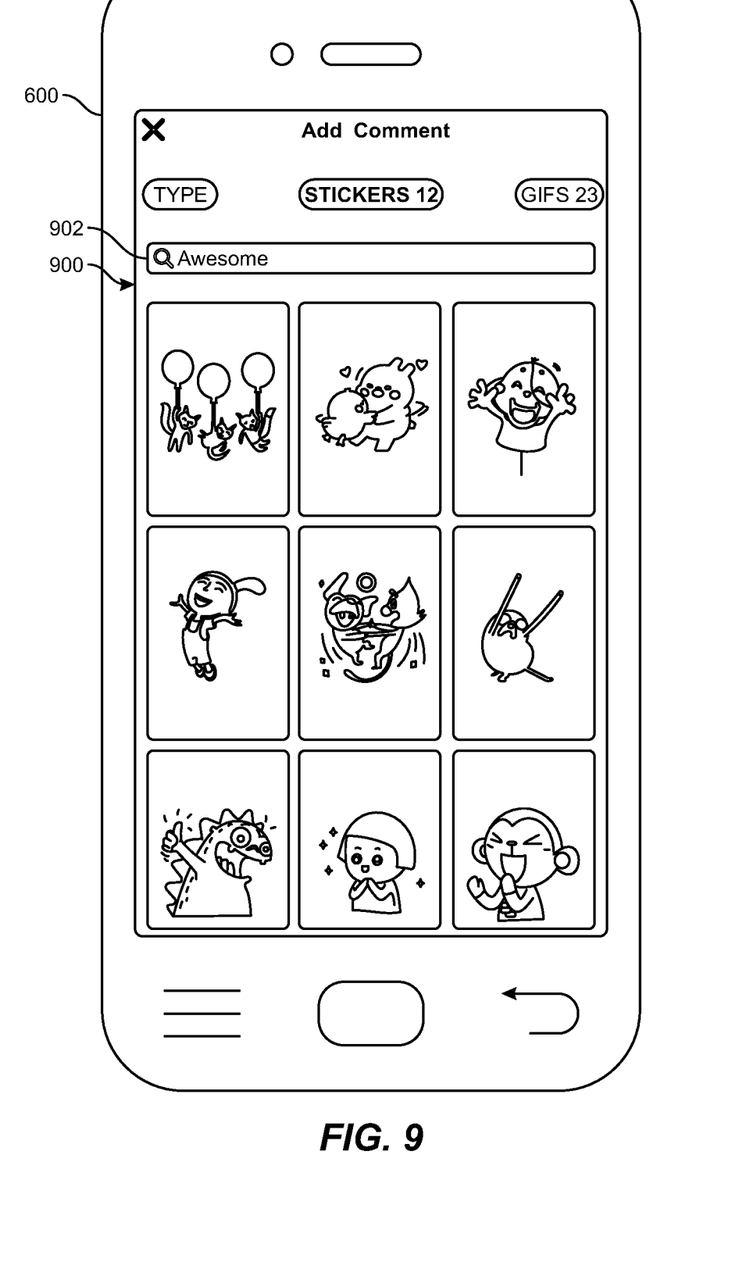
FIG. 9 illustrates an exemplary image of another user interface for composing a digital feedback story, from which a digital sticker may be selected.

In this example, an input selecting the stickers button 800 may cause the disclosed systems and methods may navigate to a stickers screen, such as the stickers screen 900 depicted in FIG. 9. Similarly, an input selecting the gifs button 802 may cause the disclosed systems and methods may navigate to a gifs screen, such as gifs screen 1000 depicted in FIG. 10.

Figure 10:
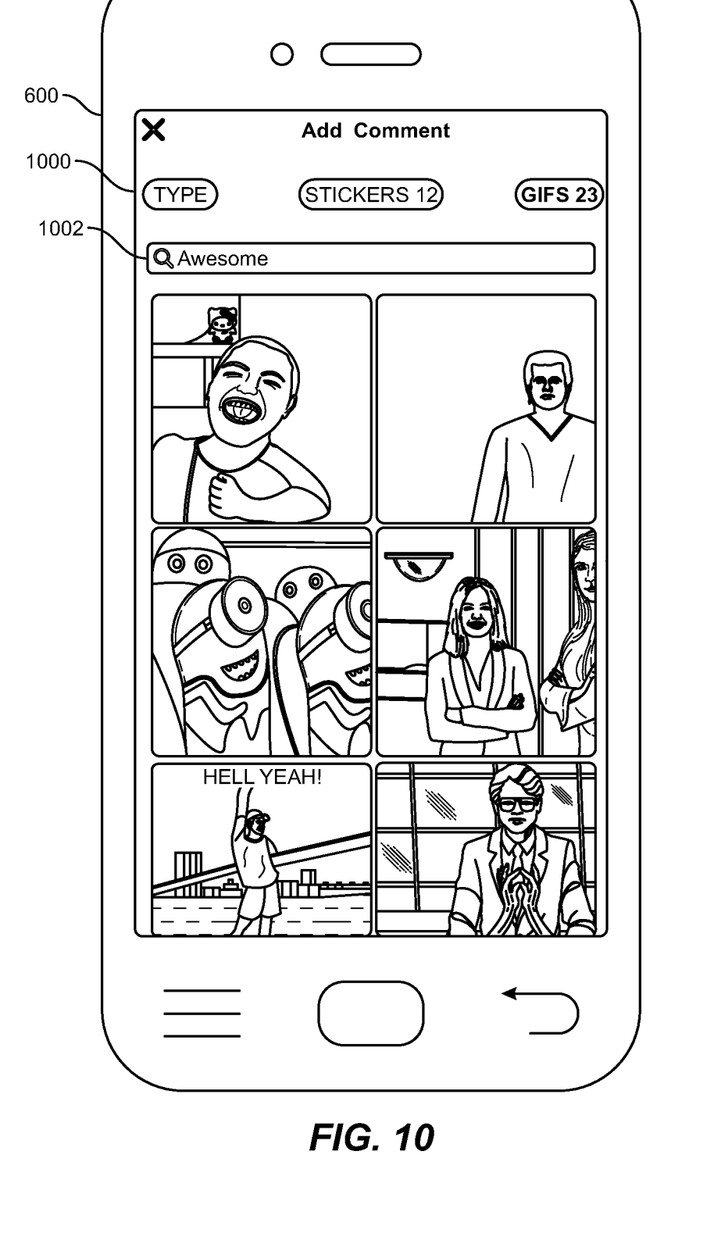
FIG. 10 illustrates an exemplary image of yet another user interface for composing a digital feedback story, from which a gif may be selected.
Figure 11:
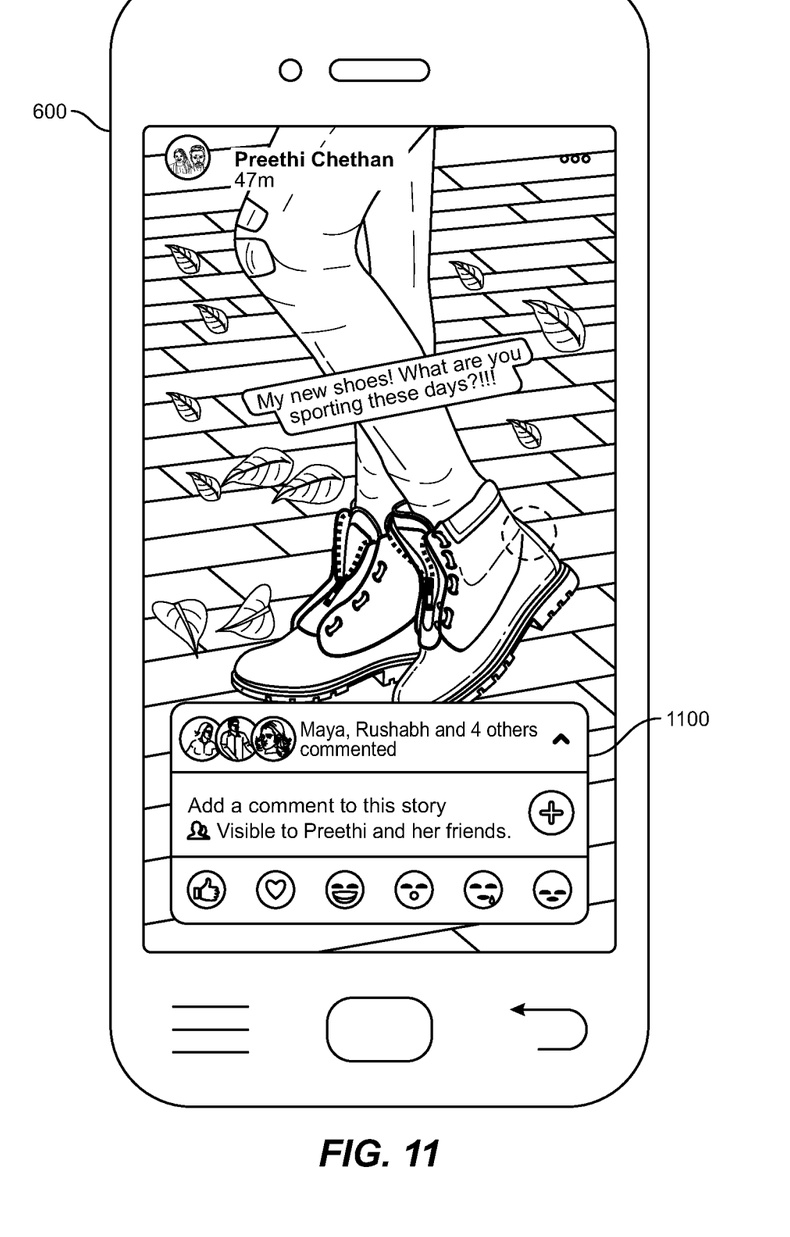
FIG. 11 illustrates an exemplary image of a user interface with an exemplary feedback prompt that also includes a summary of feedback left by other users.

In some examples, search terms for selecting visual content to display on the subsequent graphics-selection screen may automatically be generated based on content submitted to the feedback story creation screen 136. Using FIGS. 8-10 as a specific example, the disclosed systems and methods (e.g., the presentation module 142) may have identified the term "awesome" in the text submitted to the expanded text screen depicted in FIG. 8 and may have automatically used the term "awesome" as a search term for the stickers screen 900 and the gifs screen 1000, as shown in a search box 902 in FIG. 9 and a search box 10002 in FIG. 10. Additionally, results from the search may be displayed in the stickers screen 900 and/or the gifs screen 1000, as depicted in FIGS. 9 and 10, respectively.

After content is collected from the feedback-creation process initiated by input to software widget 132 (e.g., from the feedback story creation screen 136 and/or one or more additional screens in the feedback-story creation flow), a feedback story (139) may be created based on the collected content. Then, the digital story 112 may be updated with the feedback story 139 in storyline form (e.g., the feedback story 139 may be added to a data storage structure designated for the digital story 112 and/or posted to one or more additional viewers in a manner that associates the feedback story 139 with the digital story 112).

Returning to the electronic feedback prompt 130, in some examples, the prompt may include a variety of configurations. For example, the electronic feedback prompt 130 may be displayed according to the configuration depicted in FIG. 6 if, at the time the electronic feedback prompt 130 is being presented, no users have added feedback stories to the digital story 112. Additionally, the electronic feedback prompt 130 may be displayed according to the configuration depicted in FIG. 11 if, at the time the electronic feedback prompt 130 is being presented, one or more users have added feedback stories to the digital story 112 (e.g., by including a feedback summary portion 1100). In some examples, the electronic feedback prompt 130 may be configured to further change configurations (e.g., by changing a background color of the feedback summary portion 1100) depending on whether the viewer 114 has already consumed the existing feedback stories or has not consumed at least a subset of the existing feedback stories.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive user input and transform the user input into digital feedback to a digital story composition. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    posting a digital story for consumption by one or more specified users;
    providing, within the posted digital story, an electronic feedback prompt that enables a user to initiate a plurality of different types of feedback, each of which electronically portrays a reaction to the digital story, the electronic feedback prompt comprising:
        a storyline-based feedback portion that enables the user to initiate storyline-based feedback; and
        a one-click feedback portion that enables the user to initiate emoji-based feedback;
    receiving, from the electronic feedback prompt, a user selection of a selectable element corresponding to a certain type of digital feedback; and
    in response to receiving the user selection, initiating a digital creation process to create the certain type of digital feedback.

2. The computer-implemented method of claim 1, further comprising:
    prior to posting the digital story, during a story creation process:
        receiving a first input indicating that one or more portions of content are to be part of the digital story; and
        receiving a second input indicating that the digital story is available to receive storyline-based feedback, the storyline-based feedback comprising ephemeral visual content related to the digital story that is stored in a same container as the digital story.

3. The computer-implemented method of claim 1, wherein the one-click feedback portion enables the user to select an emoji with at least one of a single mouse-click or a single screen tap.

4. The computer-implemented method of claim 1, wherein:
    the storyline-based feedback comprises a feedback story with ephemeral visual content depicting a reaction to the digital story; and
    the emoji-based feedback comprises an emoji depicting a reaction to the digital story.

5. The computer-implemented method of claim 1, wherein:
    the storyline-based feedback portion comprises a software widget that initiates the digital creation of a feedback story; and
    the one-click feedback portion comprises a plurality of selectable emojis.

6. The computer-implemented method of claim 5, wherein:
    receiving the user selection of the selectable element comprises receiving input to the software widget; and
    initiating the digital creation process comprises presenting a feedback-story creation screen.

7. The computer-implemented method of claim 6, further comprising:
    creating a feedback story based on content submitted to the feedback-story creation screen; and updating the digital story with the feedback story in storyline form.

8. The computer-implemented method of claim 6, wherein the feedback-story creation screen is configured with a plurality of vertically aligned layers comprising a text layer and a media layer.

9. The computer-implemented method of claim 6, further comprising:
providing a subsequent graphics-selection screen in response to receiving content via the feedback-story creation screen; and
automatically generating search terms to select visual content to display on the subsequent graphics-selection screen based on the content received via the feedback-story creation screen.

10. The computer-implemented method of claim 5, wherein:
receiving the user selection of the selectable element comprises receiving a selection of an emoji from among the plurality of selectable emojis; and
initiating the digital creation process comprises digitally affixing the selected emoji to the digital story.

11. The computer-implemented method of claim 1, wherein the electronic feedback prompt further comprises a feedback summary portion comprising information describing existing feedback stories that have already been added to the digital story.

12. The computer-implemented method of claim 11, wherein the feedback summary portion alternates between a first configuration, indicating that a viewer has already consumed the existing feedback stories, and a second configuration, indicating that the viewer has not consumed at least a subset of the existing feedback stories.

13. A system comprising:
at least one physical processor;
physical memory comprising computer-executable instructions that, when executed by the physical processor, cause the physical processor to:
post a digital story for consumption by one or more specified users;
provide, within the posted digital story, an electronic feedback prompt that enables a user to initiate a plurality of different types of feedback, each of which electronically portrays a reaction to the digital story, the electronic feedback prompt comprising:
a storyline-based feedback portion that enables the user to initiate storyline-based feedback; and
a one-click feedback portion that enables the user to initiate emoji-based feedback;
receive, from the electronic feedback prompt, a user selection of a selectable element corresponding to a certain type of digital feedback; and
in response to receiving the user selection, initiate a digital creation process to create the certain type of digital feedback.

14. The system of claim 13, wherein the computer-executable instructions, when executed by the physical processor, further cause the physical processor to, during a story creation process:

receive a first input indicating that one or more portions of content are to be part of the digital story; and
receive a second input indicating that the digital story is available to receive storyline-based feedback, the storyline-based feedback comprising ephemeral visual content related to the digital story that is stored in a same container as the digital story.

15. The system of claim 13, wherein the one-click feedback portion enables the user to select an emoji with at least one of a single mouse-click or a single screen tap.

16. The system of claim 13, wherein:
the storyline-based feedback comprises a feedback story with ephemeral visual content depicting a reaction to the digital story; and
the emoji-based feedback comprises an emoji depicting a reaction to the digital story.

17. The system of claim 13, wherein:
the storyline-based feedback portion comprises a software widget that initiates the creation of a feedback story; and
the one-click feedback portion comprises a plurality of selectable emojis.

18. The system of claim 13, wherein the electronic feedback prompt further comprises a feedback summary portion comprising information describing existing feedback stories that have already been added to the digital story.

19. The system of claim 18, wherein the feedback summary portion alternates between a first configuration, indicating that a viewer has already consumed the existing feedback stories, and a second configuration, indicating that the viewer has not consumed at least a subset of the existing feedback stories.

20. A non-transitory computer-readable medium comprising one or more computer-executable instructions that, when executed by at least one processor of a computing device, cause the computing device to generate a user interface that facilitates:
posting a digital story for consumption by one or more specified users;
providing, within the posted digital story, an electronic feedback prompt that enables a user to initiate a plurality of different types of feedback, each of which electronically portrays a reaction to the digital story, the electronic feedback prompt comprising:
a storyline-based feedback portion that enables the user to initiate storyline-based feedback; and
a one-click feedback portion that enables the user to initiate emoji-based feedback;
receiving, from the electronic feedback prompt, a user selection of a selectable element corresponding to a certain type of digital feedback; and
in response to receiving the user selection, initiating a digital creation process to create the certain type of digital feedback.

* * * * *